United States Patent

[11] 3,633,548

[72] Inventor Orren N. Kepple
 Peoria, Ill.
[21] Appl. No. 13,346
[22] Filed Feb. 24, 1970
[45] Patented Jan. 11, 1972
[73] Assignee Creve Coeur Mfg. Co.
 East Peoria, Ill.

[54] ANIMAL PEN FLOOR AND METHOD OF FORMING
 8 Claims, 5 Drawing Figs.

[52] U.S. Cl. .................................................. 119/28,
 52/669, 94/31
[51] Int. Cl. ................................................. A01j 1/00
[50] Field of Search ....................................... 52/626,
 669, 664, 656; 119/15, 28, 22, 31.1; 94/31, 28

[56] References Cited
 UNITED STATES PATENTS
 504,924 9/1893 Jackson ....................... 52/669

2,846,931 8/1958 Priest .......................... 94/31
 3,457,901 7/1969 Abraham ..................... 119/28

*Primary Examiner*—Aldrich F. Medbery
*Attorney*—Harbaugh and Thomas

ABSTRACT: Easily handled, sanitary, lattice-type, metal slatted flooring is described wherein spaced slat members engage end support members through a tab-slot arrangement, the intermediate portions of the slats are affixed or spot-welded to intermediate support members and selected end tabs are affixed or spot-welded to the end support members, particularly at the corners. The method of fabrication includes the steps of cutting a series of spaced slots in the top wall of the end support members, bending the ends of precut slats to form a 90° tab at each end, spacing and aligning the support members with the slotted walls of the end members facing upwardly, placing the slats thereon with their end tabs in the spaced slots and welding the intermediate portions of the slats to the intermediate support members and only selected elbow bends of the tabs in the slotted end supports.

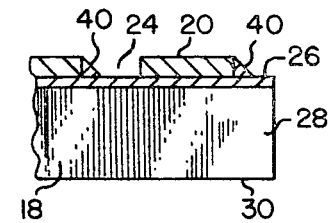
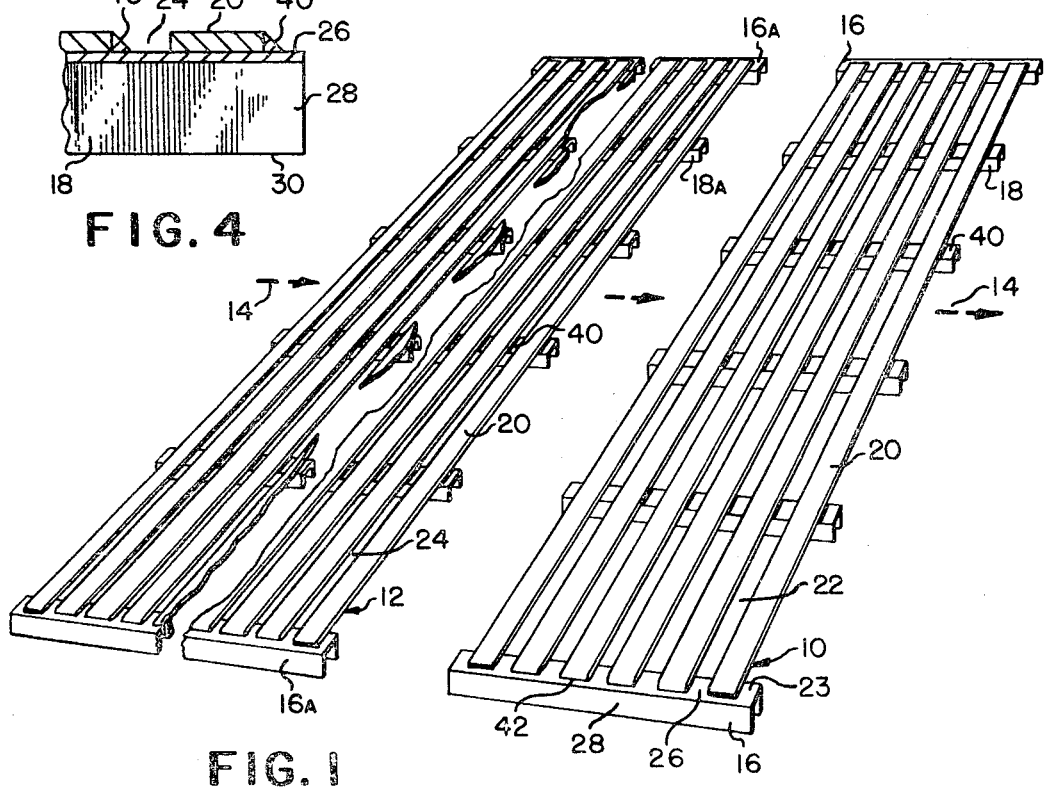
FIG. 4
FIG. 1
FIG. 1A
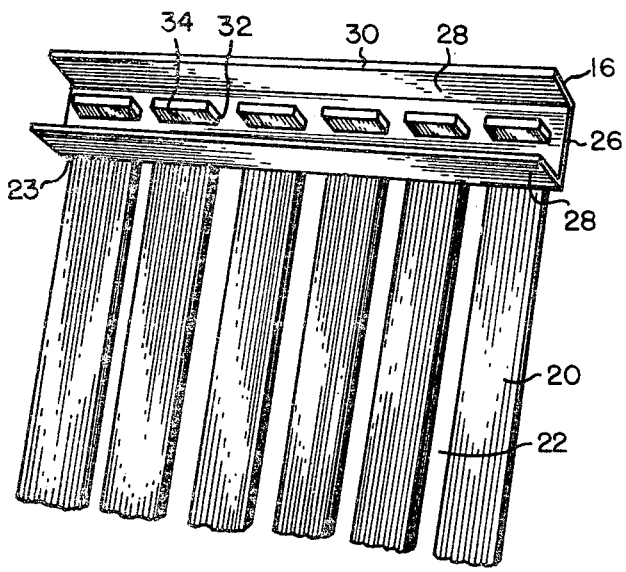
FIG. 2
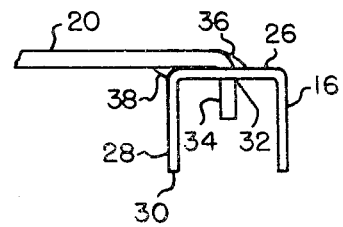
FIG. 3
INVENTOR
ORREN N. KEPPLE
BY
Harbaugh and Thomas

ANIMAL PEN FLOOR AND METHOD OF FORMING

BACKGROUND OF THE INVENTION

Heavy steel slatted floors are used in animal pens, such as farrowing pens for hogs. These floors must be strong to support the animals and provide adequate spacing or apertures between the slats and supporting members to allow spilled food, water and excrement from the animals to pass through, yet not catch the feet of the animals and at the same time allow easy cleaning. To accomplish these results the slatted floors of the prior art are fabricated of heavy gauge bar stock and angle irons arranged in a lattice work and welded together at each juncture. Such slatted floors are extremely cumbersome to handle to the extent that it is necessary to either disassemble the farrowing crate and/or raise the farrowing crate in order to clean the floor in and around the pen. Because of the construction and design used in these slatted floors each juncture of slat and support must be welded and the number of welds used is substantial with the result that a costly, heavy, cumbersome and inefficient floor is produced. These and related problems are overcome by providing spaced channel support members with flat transverse slats attached thereto in a particular manner whereby the flooring sections are lighter in weight, stronger, and easily handled for cleaning.

SUMMARY OF THE INVENTION

This invention concerns slatted metal floor sections for an animal pen wherein the design and arrangement of the slats and support members allows a considerable reduction in the number of welds necessary to form a floor of adequate strength at less cost that can be easily handled and cleaned. This is accomplished in one embodiment by providing spaced slots in the top wall of an end support member and 90° bent tabs on an end of each slat which fit into spaced corresponding slots in the top wall of the end support and welding the slats to the intermediate supports and the outer slats or corner slats only to the end support.

DESCRIPTION OF THE DRAWINGS

An illustrative embodiment of the invention is shown in the drawings wherein:

FIG. 1 is a perspective view of a front section and FIG. 1-A is a perspective view of a rear section of slatted flooring fabricated in accordance with this invention for use with a farrowing pen;

FIG. 2 is a fragmentary view of the underneath portion of one end of a front section showing the protruding tabs attaching through the top wall of an end support member;

FIG. 3 is a partial side plan view of the front section of floor shown in FIG. 1; and FIG. 4 is a partial cross-sectional view taken along the end of an intermediate support.

THE PREFERRED EMBODIMENT

Referring to FIG. 1 there is shown a front section 10 and in FIG. 1-A there is shown a rear section 12 of slatted flooring of this invention. When fabricated for use with a farrowing pen the front section 10 will be about 12 inches wide and about 5 feet long while the rear section 12 is about 30 inches wide and about 5 feet long. The flooring can be made in one piece or in sections, the latter being easier to handle. The sections 10 and 12 such as illustrated in FIGS. 1 and 1-are fabricated for use as the floor for hog farrowing pens. The sections are placed transverse the longitudinal axis of the pen so that the hog, because of the limited space of the pen has a part of the front section 10 for the front feet and a part of the rear section 12 for the hind feet. The balance of the floor sections provide a floor covering on each side of the pen for the shoats. The sections 10 and 12 are arranged in FIG. 1 in substantially the position they would be placed for use with a farrowing pen (not illustrated) wherein the longitudinal axis of the pen may be illustrated by the broken line of arrows 14.

The front section 10 comprises the pair of end support members 16 between which are arranged, in substantially equal spaced and coplanar relationship, the intermediate support members 18. A plurality of longitudinal slats 20 are arranged transversely across the flat top provided by the support members 16 and 18. The spacing between the slats indicated at 22 is subject to variation and is generally about one-half inch to seven-tenths inch for hogs. Using slats 20 which are fabricated from 1¼-inch steel strip (14 gauge) the spaces 22 will each be about 0.64 inch wide and the outermost of the slats will be spaced from the end of each support member as indicated at 23, by about five-eighths inch. The rear section 12 likewise comprises a pair of end support members 16a which are cut from the same stock as the support members 16, but are about 30 inches long. The rear section 12 is provided with the intermediate support members 18a that are like the intermediate support members 18 of the front section 10, only cut to 30-inch lengths. The slats 20 used for the rear section 12 are identical with the slats 20 of the front section 10. The spacing 24 between the slats 20 of the rear section 12 can be the same or different from the spacing 22 in the front section 10.

Referring to FIG. 2, showing the underside of one end of the front section 10, it is seen that the end support member 16 is U-shaped or is a form channel member having the flat top wall 26 and spaced parallel depending walls 28 with the flat coplanar edges 30 which rest upon the floor of the enclosure for the animals. Preferably farrowing pens are used on a hard planar surface such as stone or concrete, so that a firm under support is provided and the areas around and under the pen are easier to clean.

The top walls 26 of the end support members 16 are generally flat and are provided with a series of equally spaced slots 32. The terminal ends of the slats 20 each have a depending tab 34 bent at an angle of about 90° from the longitudinal axis of the slat. The slots 32 are essentially rectangular in shape and of a size sufficient to receive the tabs 34 as shown. The tabs 34 need only be long enough to engage the slats firmly and are shorter than the depth of the walls 28.

Referring to FIG. 3 it is seen how the end or edge slat 20 lies flat across the top walls 26 of the series of channel supports 16, the bottom edges 30 of which are coplanar. These outer slats are welded to the outer support members as indicated by the upper weldments 36 and the lower weldments 38.

In FIG. 4 it is seen that the juncture of each slat with an intermediate support is welded as indicated at 40. This same arrangement of welds is repeated in the rear section 12. The end junctures 42 (FIG. 1) of the slats intermediate the edge slats of both sections 10 and 12 are not welded. Either of the welds 36 and 38 for the floor sections 10 and 12 can be omitted from the structure. By this construction the fabrication of the parts, their assembly and the welding of the parts together is facilitated. Thus by actual count there are 28 welds in the section 10, if only the upper welds 36 are used, and 32 welds in the section 10 if the welds 38 are also used. The prior art structures of the same dimensions have from 139 to 143 welds which is a saving of some 111 welds in this assembly alone. For the larger section 12 a saving of 399 welds can be realized.

The method of this invention is carried out by:

1. Cutting a plurality of the channel members to the desired length.
2. Punching the slots 32 in selected channel members in one stroke of a brake press.
3. Cutting a plurality of the slat members to the desired length.
4. Bending the ends of the slat members to form the tabs 34 at each end.
5. Arranging the channels in parallel coplanar spaced relationship with a slotted channel at the outer ends.
6. Placing the slats thereupon with their tabs in corresponding slots in the channel members according to the spacing of the slats.
7. Welding the intermediate junctures of the top walls of a substantial portion or all of the slats, and 8. Welding the junctures of the outermost slats at the ends of the outer channels.

The process lends itself to mass production and assembly of the parts at greatly reduced cost of materials, manpower, and machinery power. The end product is relatively light in weight, easily handled and provides spaces between the slots and between the channels which are easily hosed clean. The longitudinal openings of the channels do not accumulate much debris, but any that is collected therein can be flushed out with a hose. The openings and spaces between the slats and channels plus the spacing of the slats above the floor allow easy hose cleaning of the entire sections. The flooring of this invention can be used wherever it is necessary to provide safe, strong, easily cleaned, and sanitary flooring for farm, circus or zoo animals, and the like. Thus cattle stalls, circus wagons, horse and cattle trailers and cages can be provided with the sanitary flooring of this invention.

By providing the arrangement of slats and transverse support members shown the fabricator can select other patterns for the location of the weldments. Also the welding of the slats is made more convenient since they can be along the same side of the slats and the positioning of the welding equipment and welder along the assembly line is facilitated. For some of these structures a further saving in the number of welds can be attained by alternating the intermediate welds 40 or adopting a pattern wherein some of these welds are omitted. The spacing between the slats and between the supports can be adjusted so as to provide a flooring which is adapted to safely support thereon animals having different sizes and kinds of hooves. The flooring of this invention can be used wherever a sanitary, easily cleaned floor covering is required. By using lighter gauge slats and supports a very convenient flooring can be fabricated for behind the counter use in bars, restaurants, soda fountains, or out-of-doors where it is intended that a firm floor be provided over grass or muddy areas.

What is claimed is:

1. Safety flooring comprising
a series of spaced support members arranged in substantially parallel configuration along one axis,
the endmost of said support members having a series of spaced slots in a top wall thereof,
a series of slat members arranged across the tops of said support members and transverse said axis,
said slat members having downturned end tabs adapted to engage within the slots of said endmost support members, and
means for attaching said slat members to said support members at selected junctures including the corner junctures of the outermost slat members and the end most support members.

2. Safety flooring in accordance with claim 1 in which
said attaching means are weldments at said junctures.

3. Safety flooring in accordance with claim 2 in which
said weldments are located at the edges of the slat members and the top wall of said support members.

4. Safety flooring in accordance with claim 2 in which
said weldments are located at the junctures of said tabs with the side edges of said slots.

5. Safety flooring in accordance with claim 1 in which
said attaching means are weldments located along the same side of each slat at its juncture with the top side of selected intermediate support members, and
the attaching means for the outermost slat members and the endmost support members are weldments located at the juncture of the base of said tabs with the top edge of the slots in the top wall of said support members.

6. Animal pen safety flooring including a section comprising
a series of equal length spaced flat-topped channel iron support members arranged in substantially parallel configuration along one axis,
said channel support members having their respective ends aligned with their respective top flat walls and bottom edges arranged in substantially planar relationship,
the endmost of said support members having a series of spaced slots in the top walls thereof, the longitudinal axis of said slots being coincident with said axis,
a series of flat slat members arranged transversely and in spaced substantially parallel relationship across and upon the flat tops of said channel support members,
said flat slat members having down-turned end tabs engaging within said slots of said endmost channel members, and
rigidifying weldments at the junctures of said slat members and said intermediate channel members and at the corner junctures of said tab members of the outermost slat members and the endmost channel members.

7. Animal pen safety flooring in accordance with claim 6 adapted for use with a farrowing pen comprising
a pair of said sections arranged with the axes of said channel support members aligned with the longitudinal axis of said pen and spaced from each other to provide a forefoot supporting area and a hind foot supporting area.

8. The method of manufacturing safety flooring which includes the steps of
providing a plurality of channel members of a desired length,
punching a series of spaced slots in the top wall of selected channel members,
providing a plurality of slat members of a desired length,
bending the ends of the slat members to form downturned tabs depending from the same side thereof,
arranging the channel members in substantially parallel coplanar spaced relationship with a slotted channel member at each end of the arrangement,
placing the slat members thereon with their tabs in the respective slots of the end channel members, and
welding said slats to said channel members at selected places including the intermediate channel members and the corner juncture of the outer slat members with the ends of the end channel members.

* * * * *